United States Patent [19]

Murvall

[11] 3,871,785
[45] Mar. 18, 1975

[54] NUT LOCKING DEVICES

[75] Inventor: Ake Eugen Murvall, Svangsta, Sweden

[73] Assignee: Abu Aktiebolag, Svangsta, Sweden

[22] Filed: June 22, 1973

[21] Appl. No.: 372,617

[30] Foreign Application Priority Data
June 29, 1972   Sweden.............................. 8546/72

[52] U.S. Cl................. 403/259, 403/320, 151/27 R
[51] Int. Cl.............................................. F16d 1/06
[58] Field of Search .. 151/2 R, 25 R, 27 R, 14 DW, 151/14 R, 30 R, 29, 3; 403/320, 259, 258

[56] References Cited
UNITED STATES PATENTS

| | | | |
|---|---|---|---|
| 606,582 | 6/1898 | Rohlin | 151/29 |
| 107,549 | 10/1913 | Hickerson | 151/25 R |
| 768,954 | 8/1904 | Romberger | 151/29 |
| 1,266,594 | 5/1918 | Hickerson | 151/3 |
| 1,795,570 | 3/1931 | Nilson | 151/14 R |
| 2,307,747 | 1/1943 | Pflueger | 403/259 |

*Primary Examiner*—Andrew V. Kundrat
*Attorney, Agent, or Firm*—Karl W. Flocks

[57] ABSTRACT

This invention relates to a locking device comprising a locking washer of compact construction for locking a nut relative to a threaded part, especially a nut for fixing the hand operated crank of a fishing reel, said locking washer having a tongue extending substantially perpendicularly from the plane of the washer at the inner periphery thereof and having an inwardly bent outer end portion adapted to contact an axially extending flat on said threaded part and to serve as a spacer to hold the remaining portion of said tongue displaced from the threads of the threaded part until the nut is tightened, wherein the tongue will be received between said flat on the threaded part and the nut and depressed therebetween to secure the nut on the threaded part.

7 Claims, 4 Drawing Figures

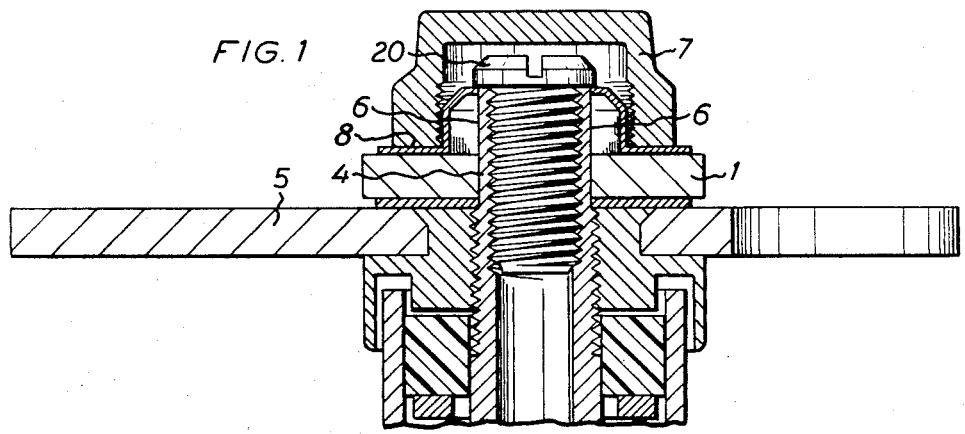
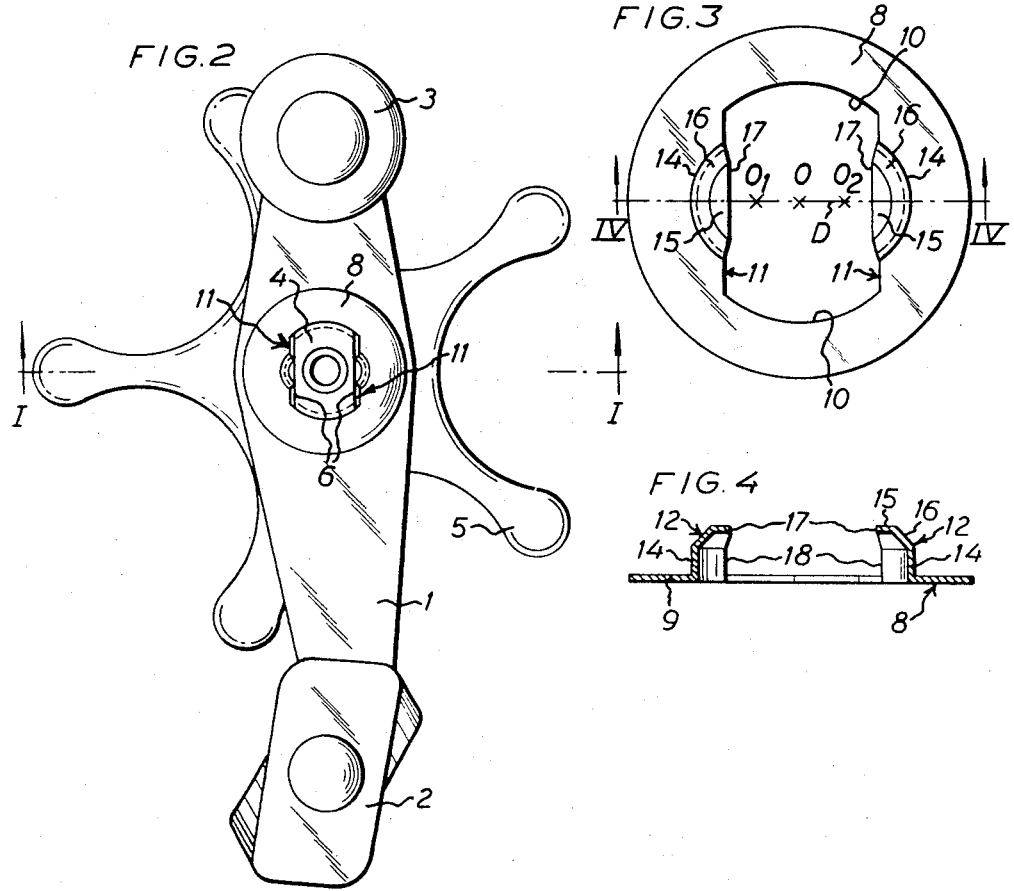

NUT LOCKING DEVICES

This invention relates to a locking device for nuts, especially a nut for a fishing reel.

In reels for cast-fishing (rotatable spool or fixed spool reels and fly-fishing reels) nuts often are used for retaining certain elements, e.g., for retaining the crank or for tightening the axial end bearings. Such nuts, which should be capable of being screwed on and unscrewed by hand or by means of simple tools, have a tendency to come loose by themselves and can then be lost during angling and if the angler has no spare nuts available or has forgotten them at home, the angling must be interrupted.

Especially, but not exclusively, for nuts used for retaining elements in fishing reels there is a need for a locking device which is corrosion-proof, which will not destroy the finish of surfaces in contact therewith and which will not require too much axial space. For these reasons, conventional locking washers of steel having one or more sharp edges are unsuitable.

Another requirement of a locking device of this kind is that it should secure satisfactory retention of the nut to the threaded part on which it is mounted without unnecessarily complicating the engagement and disengagement of a nut by hand or by means of simple tools. Finally, the locking device should be of a simple design suitable for cheap large-scale manufacture.

The invention has for its object to provide a locking device complying with all these requirements and this object is realized in that the locking device of this invention comprises a locking washer for locking a nut in relation to a threaded part having at least one axially extending flat portion to be received unrotatably by a hole of corresponding shape in said threaded part, said locking washer at the inner periphery thereof defining said hole having a tongue projecting generally perpendicularly from the plane of the locking washer and having an outwardly convex and inwardly concave base portion and an inwardly extending outer end portion, said end portion being adapted, with the washer in intended position on said threaded part, to be directed towards said flat portion of said threaded part with at least a substantial part of said base portion facing the nut, said tongue being so dimensioned that at least a portion of its outer peripheral surface in said position of the washer is spaced from the inner diameter of the threads of the threaded part such that said tongue, when tightening the nut on the threaded part, will be pressed inwardly by the threads of the nut thereby to form a frictional connection between the nut and the threaded part.

Further objects of this invention and advantages gained thereby will appear from the following.

The invention will be more fully described hereinbelow with reference to the accompanying drawing, in which:

FIG. 1 is an axial sectional view taken along line I—I of FIG. 2 and shows on a larger scale the outer part of the drive shaft of a fishing reel and a control member for a frictional drag or sliding slutch, the crank nut and a locking washer designed to cooperate with the crank nut and the drive shaft according to the invention;

FIG. 2 is a plan view of the hand operated crank and control member for the clutch; the crank nut is removed to show the locking washer and its cooperation with the drive shaft;

FIG. 3 is a plan view of the locking washer according to the invention; and

FIG. 4 is a cross-sectional view of the locking washer taken along line IV—IV of FIG. 3.

The hand operated crank 1 as shown in FIGS. 1 and 2 has at one end a handle 2 and at the other end a counterweight 3 and is mounted on a shaft 4 for driving the spool of a fishing reel of known design (not shown) via a drag or sliding clutch of frictional type which is adjustable by means of a control member 5 between the spool and the shaft 4.

The outer end portion of the shaft 4, on which the crank 1 is mounted, is threaded but has two diametrically positioned, axially extending parallel flat surfaces 6 and the crank 1 has in a central part between the counterweight and the handle a hole of a shape corresponding to the cross-sectional shape of the shaft 4, i.e., a hole defined by two diametrically positioned circular surfaces and two flat surface portions for driving engagement with the flat surfaces 6 of the shaft. The crank is fixed on the shaft 4 by means of a cap-shaped hexagonal nut 7 screwed on the threaded outer end portion of the shaft.

Mounted on the shaft 4 or, more exactly, between the crank 1 and the nut 7 is a locking washer 8 which is designed in a special fashion according to the invention for cooperation with both the shaft 1 and the nut 7.

The locking washer 8, which is shown in detail in FIGS. 3 and 4, comprises a flat portion 9 having a hole therein generally corresponding to the hole in the crank 1, i.e., the hole in the washer is defined by two diametrically positioned circular edge portions 10 and two approximately straight edge portions, generally designated by 11, joining said edge portions 10. On a diameter bisecting these straight edge portions 11 the washer has two tongues 12 projecting substantially perpendicularly from the plane of the washer and being integral with the washer and having each a circular base portion 14, an inwardly extending generally flat top portion 15 and a tapered portion 16 joining these portions. The flat top portions 15 end in straight edges 17. As will appear from the following the dimensions of these tongue portions play an essential part for the function of the locking washer.

The straight parallel outer edges 17 of the two tongues 12 should have a satisfactory fit with respect to the corresponding flat surfaces 6 of the shaft 4. The distance between said edge surfaces 17 may possibly be somewhat smaller than the thickness of the shaft 4 between the flat shaft surfaces 6 to obtain a resilient application of the tongue tips 17 to the shaft surfaces 6 before the nut 7 is engaged. The centers $O_1$, $O_2$ for the peripheral surfaces of the base portions 14 of the tongues are situated on either side of the center O of the washer 8 on a washer diameter D, and the distance between the peripheral surfaces 14 on said washer diameter D is greater than the inner diameter of the threads of the nut 7 and thus greater than the outer diameter of the screw thread on the shaft 4. Due to this dimensional difference the nut threads will be urged against the tongue surfaces 14 when the nut is tightened and this will result in a frictional engagement of the nut against the tongues 12 positioned between the nut and the shaft. At the same time the end surfaces 17 of the tongues 12 are urged into tighter engagement with the flat surfaces 6 of the shaft, which ensures a fit without play between the locking washer and the shaft.

This double function of the tongues 12 provides a very good locking of the nut 7.

The locking washer may be made of a thin corrosion-proof strip material by a simple punching and pressing or drawing operation. From the point of view of manufacture it is advisable to use a slightly resilient material and it is possible to make the locking washer from such material without jeopardizing its function, since it is possible to choose quite a great measurement difference between, on one hand, the maximum distance between the base periphery surfaces 14 of the tongues 12 and, on the other hand, the inner diameter of the nut 7. Certainly the tongues 12 will be deformed when the nut is tightened but when using a slightly resilient material there will remain a sufficient recoil which permits repeated screwing and unscrewing of the nut without the locking properties of the locking washer being lost.

As shown in FIGS. 3 and 4, the edges 18 of the tongues at the tongue bases 14 are substantially closer to the center O of the hole in the washer than the periphery of the tongue base portions 14 on the diameter on which the three centers O, $O_1$ and $O_2$ are positioned, but at a greater distance from the center O of the washer than the ends 17 of the tongues. When the tongues are pressed inwardly by means of the nut 7, said edges 18 will abut the flat shaft surfaces 6 (see FIG. 2), whereupon the resistance to pressing the tongues inwardly will increase. The tongues can be pressed further towards the flat surfaces 6 only if the tongue edges 18 at the same time are pressed outwardly away from each other. Thus, by dimensioning the tongues in a suitable manner it will be possible to vary the frictional engagement obtained when tightening the nut.

In order that the crank 1 should not be lost when the nut 7 is unscrewed from the shaft 4, the shaft 4 has a threaded bore in its outer end portion for receiving a locking screw 20 having a head of a greater diameter than the minimum dimension of the crank hole but of smaller diameter than the inner diameter of the nut 7. According to the invention this screw 20 may be utilized also to retain the locking washer 8 in a similar way. For this purpose the distance between the tongue ends 17 is so adjusted that the screw head retains the locking washer.

What I claim and desire to secure by Letters Patent is:

1. A locking device comprising a locking washer for locking a nut in relation to a threaded part where said threaded part has at least one axially extending unthreaded flat surface portion, said locking washer having a flat portion with an aperture having a shape to accommodate the washer non-rotatably on said threaded part, said locking washer at the inner periphery thereof defining said aperture having at least one tongue adapted to be received between the nut and said flat surface portion of said threaded part and projecting generally perpendicularly from the plane of said flat portion of the locking washer and comprising an outwardly convex and inwardly concave base portion and a radially inwardly extending outer end portion, said end portion being adapted, with the washer in intended position on said threaded part, to be directed towards said flat surface portion of said threaded part with at least a substantial part of said base portion of the tongue facing the nut, said tongue being so dimensioned that at least a portion of its outer peripheral surface in said position of the washer is spaced from the inner diameter of the threads of the threaded part and that said tongue, when the nut is tightened on the threaded part, will be pressed inwardly by the nut thereby to form a frictional connection between the nut and said threaded part.

2. A locking device as defined in claim 1, wherein the aperture in the locking washer and the inwardly extending outer end portion of the tongue are so dimensioned that the inwardly facing tongue end is so fitted with said flat surface portion of the threaded part, on which the locking washer is placed, that the tongue end, when the nut is tightened and the tongue consequently is urged inwardly towards the threaded part, is pressed against the flat surface of the threaded part to secure a fit without play between the locking washer and the threaded part.

3. A locking device as defined in claim 6, wherein axially extending edge surfaces of said base portion of the tongue are situated closer to the center axis of the locking washer than the wall of the said base portion between these edge surfaces but a greater distance from the center axis of the locking washer than the end of the inwardly extending end portion of the tongue.

4. A locking device comprising a crank having a retaining nut on a threaded end portion of the drive shaft of a fishing reel, said threaded end portion having two diametrically positioned unthreaded, axially extending parallel flat surfaces and said crank having an aperture therein corresponding to the cross-section of said shaft end portion to receive the latter in driving engagement therewith, said crank when mounted in such driving engagement being fixed to said shaft by means of said nut mounted on said end portion; a locking washer having a flat base portion with a central aperture of a shape adapted to permit mounting the locking washer on said shaft end portion with said flat base portion placed between the crank and the nut when the latter is mounted on said shaft end portion; the aperture in the locking washer having a shape adapted to hold the locking washer in a non-rotatable position on said shaft end portion, said aperture in the washer having two diametrically positioned circular end portions and an intermediate portion the central part of which is flanked at opposite edges thereof by two diammetrically positioned identical tongues projecting substantially perpendicularly from the plane of said flat base portion of the locking washer and having each an outer convex surface, an inner concave surface and a radially inwardly extending outer end portion, the outer end portions of said tongues being adapted to bear against said two diammetrically positioned flat surfaces on the threaded shaft portion with each of the tongues positioned between the nut and a corresponding one of said flat surfaces of said shaft portion, and wherein the maximum distance between the outer peripheral surfaces of the tongues on a washer diameter is somewhat greater than the inner diameter of the nut thread, such that said tongues, when the nut is tightened on the threaded shaft portion, will be pressed inwardly by the threads of the nut thereby to form a frictional connection between the nut and the threaded part.

5. A locking device as defined in claim 4, wherein each tongue has a base portion the outer peripheral surfaces of which are in the form of circular cylinder surfaces having smaller radii than the radius of the circular portions of said aperture in the washer.

6. A locking device as defined in claim 4, wherein the axially extending edge surfaces of said base portion of each tongue are situated closer to the center axis of the aperture in the locking washer than the wall of the said base portion of the tongue between said edge surfaces but at a greater distance from the center axis of the aperture in the locking washer than the outer end of the inwardly extending end portion of the tongue.

7. A locking device as defined in claim 4, wherein the outer end of each tongue has a straight outer edge for engagement with the corresponding flat surface on the threaded shaft portion.

* * * * *